US011016976B1

(12) United States Patent
Singhal et al.

(10) Patent No.: US 11,016,976 B1
(45) Date of Patent: May 25, 2021

(54) DATABASE FILE MANAGEMENT AND DATA STRUCTURES FOR CREATING AND/OR MODIFYING A DATABASE MANAGEMENT SYSTEM TO REDUCE STORAGE REQUIREMENTS

(71) Applicant: Topia Limited, San Francisco, CA (US)

(72) Inventors: Anupam Singhal, Jersey City, NJ (US); Nishant Mittal, New York, NY (US)

(73) Assignee: Topia Limited, San Francisco, CA (US)

( * ) Notice: Subject to any disclaimer, the term of this patent is extended or adjusted under 35 U.S.C. 154(b) by 0 days.

(21) Appl. No.: 17/085,896

(22) Filed: Oct. 30, 2020

Related U.S. Application Data

(63) Continuation-in-part of application No. 13/872,730, filed on Apr. 29, 2013, now abandoned.

(60) Provisional application No. 61/639,990, filed on Apr. 29, 2012.

(51) Int. Cl.
| | |
|---|---|
| *G06F 16/23* | (2019.01) |
| *G06F 16/29* | (2019.01) |
| *G06F 16/2455* | (2019.01) |
| *G06F 16/22* | (2019.01) |
| *G06F 16/2457* | (2019.01) |

(52) U.S. Cl.
CPC .... *G06F 16/24564* (2019.01); *G06F 16/2291* (2019.01); *G06F 16/2358* (2019.01); *G06F 16/24573* (2019.01); *G06F 16/29* (2019.01)

(58) Field of Classification Search
None
See application file for complete search history.

(56) References Cited

U.S. PATENT DOCUMENTS

| | | | |
|---|---|---|---|
| 7,092,943 B2 | 8/2006 | Roese et al. | |
| 7,599,847 B2 | 10/2009 | Block et al. | |
| 7,904,244 B2 | 3/2011 | Sugla | |
| 8,458,058 B2 | 6/2013 | Kuchs et al. | |
| 8,554,709 B2 | 10/2013 | Goodson et al. | |
| 8,660,876 B2 | 2/2014 | Woodings | |
| 9,262,475 B2 * | 2/2016 | Bernier | G06F 16/2453 |
| 2008/0227473 A1 | 9/2008 | Haney | |
| 2012/0233043 A1 | 9/2012 | Goldscheider | |

(Continued)

OTHER PUBLICATIONS

Topia monaeo—Google Search captured on Jan. 22, 2021, Google, https://www.google.com/search?source=hp&ei=shoLYPjkHt-I5NoP782mkAU&q=topia+monaeo&oq=topia+mona&gs_lcp=CgZwc 3ktYWIQAxgAMgIIADIGCAAQFhAeOgglABCxAxCDATOLCC 4QsQMQxwEQowl6CAguELEDEIMBOg4ILhCxAxDHARCjAhC TAjoCCC46BQguELEDOgglABCxAxDJAzoFCAAQkgM6CAgu EMcBEK8BOgU.*

(Continued)

*Primary Examiner* — Jason G Liao

(57) ABSTRACT

One or more embodiments described herein relate to database and data structure management to improve the storage capabilities and processing accuracy of location data for compliance monitoring. In known database systems, the quantity of location data available and/or collected can pose storage and/or processing challenges. Some embodiments described herein relate to the management of databases and/or data structures, including when data is created, modified, and/or deleted, to improve storage efficiency and/or relevance of stored data. One or more systems and methods described herein may automate the process of monitoring, collecting, storing, analyzing, and utilizing data and information.

15 Claims, 17 Drawing Sheets

(56) References Cited

U.S. PATENT DOCUMENTS

2012/0310700 A1 12/2012 Kurtz et al.
2013/0166607 A1 6/2013 Turk et al.
2013/0290200 A1* 10/2013 Singhal .............. G06Q 10/0637
705/317

OTHER PUBLICATIONS

Office Action dated Oct. 11, 2016, for U.S. Appl. No. 13/872,730, 29 pages.
Office Action dated Jul. 21, 2017, for U.S. Appl. No. 13/872,730, 25 pages.
Office Action dated Aug. 29, 2018, for U.S. Appl. No. 13/872,730, 28 pages.
Office Action dated Jun. 13, 2019, for U.S. Appl. No. 13/872,730, 23 pages.
Office Action dated Apr. 30, 2020, for U.S. Appl. No. 13/872,730, 17 pages.

* cited by examiner

DATABASE FILE MANAGEMENT AND DATA STRUCTURES FOR CREATING AND/OR MODIFYING A DATABASE MANAGEMENT SYSTEM TO REDUCE STORAGE REQUIREMENTS

CROSS-REFERENCE TO RELATED APPLICATIONS

This application is a continuation-in-part of U.S. patent application No. 13/872,730, entitled "Systems and Methods of Compliance Tracking," filed Apr. 29, 2013, which claims priority under 35 U.S.C. 119(e) to U.S. Provisional Application No. 61/639,990, entitled "Systems and Methods of Compliance Tracking," filed on Apr. 29, 2012.

FIELD

One or more embodiments described herein generally relate to databases designed, structured, and/or implemented to manage definition and/or creation of data, to reduce data storage requirements and improve reliability of analysis performed on data stored within databases.

BACKGROUND

As globalization increases, the complexity of compliance becomes increasingly onerous. For example, complying with certain rules in different regulatory jurisdictions in situations of geo-physical mobility of independent individuals or employees is becoming increasingly complex. Further, regulatory authorities globally are becoming very aggressive in enforcing certain regulations, and frequently the burden of proof lies on the independent individuals or employees to provide credible evidence in the event that the independent individuals or employees is audited. Known methods of tracking regulatory-related information include paper and electronic records, which need to be manually generated. As a result, such records may put the credibility of the independent individuals or employees at risk by being incomplete, inaccurate, unreliable, passive and self-reported.

To make efficient decisions and to stay in compliance, it is desirable to have systems and methods to monitor, capture, store analyze and utilize information and data that affects the determination of magnitude of exposures and consequently the calculation pertaining to various types of compliance and operations management. Additionally, automated systems and methods that reduce the time, effort, and cost of obtaining and utilizing data for compliance are desirable.

SUMMARY

One or more embodiments described herein relate to database and data structure management to improve the storage capabilities and processing accuracy of location data for compliance monitoring. In known database systems, the quantity of location data available and/or collected can pose storage and/or processing challenges. Some embodiments described herein relate to the management of databases and/or data structures, including when data is created, modified, and/or deleted, to improve storage efficiency and/or relevance of stored data. One or more systems and methods described herein can automate the process of monitoring, collecting, storing, analyzing, and utilizing data and information for regulatory compliance.

BRIEF DESCRIPTION OF THE DRAWINGS

A more detailed understanding may be had from the following description, given by way of example in conjunction with the accompanying drawings wherein.

DETAILED DESCRIPTION

Figure 1A:
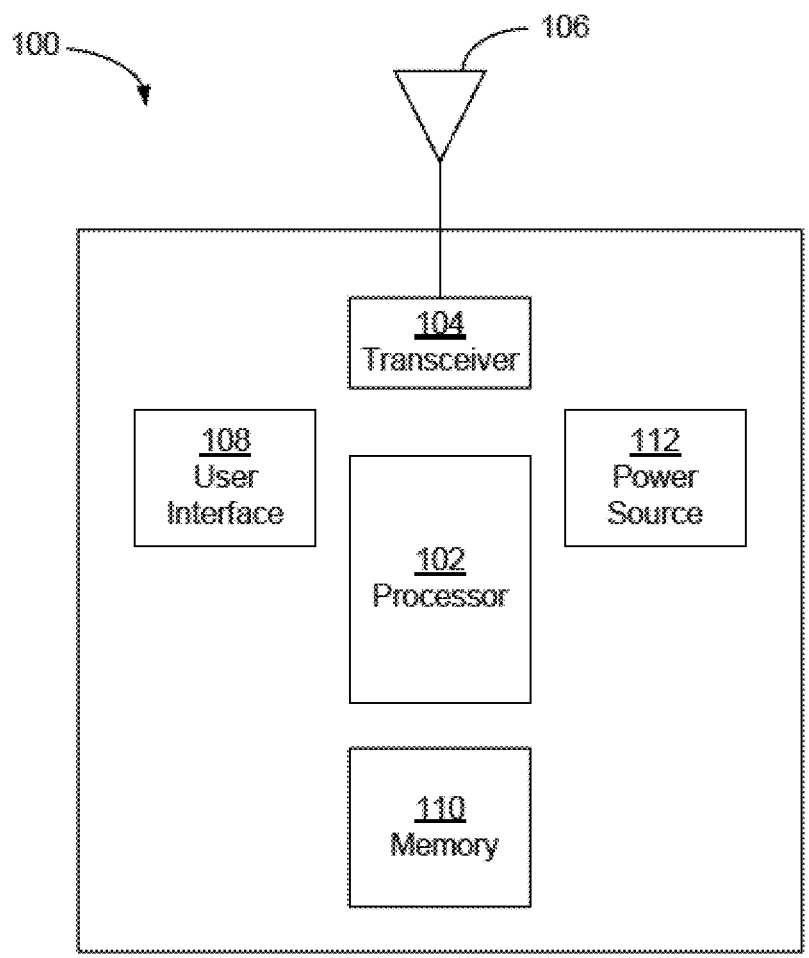
FIG. 1A is a high-level block diagram of an example mobile device.
Figure 1B:
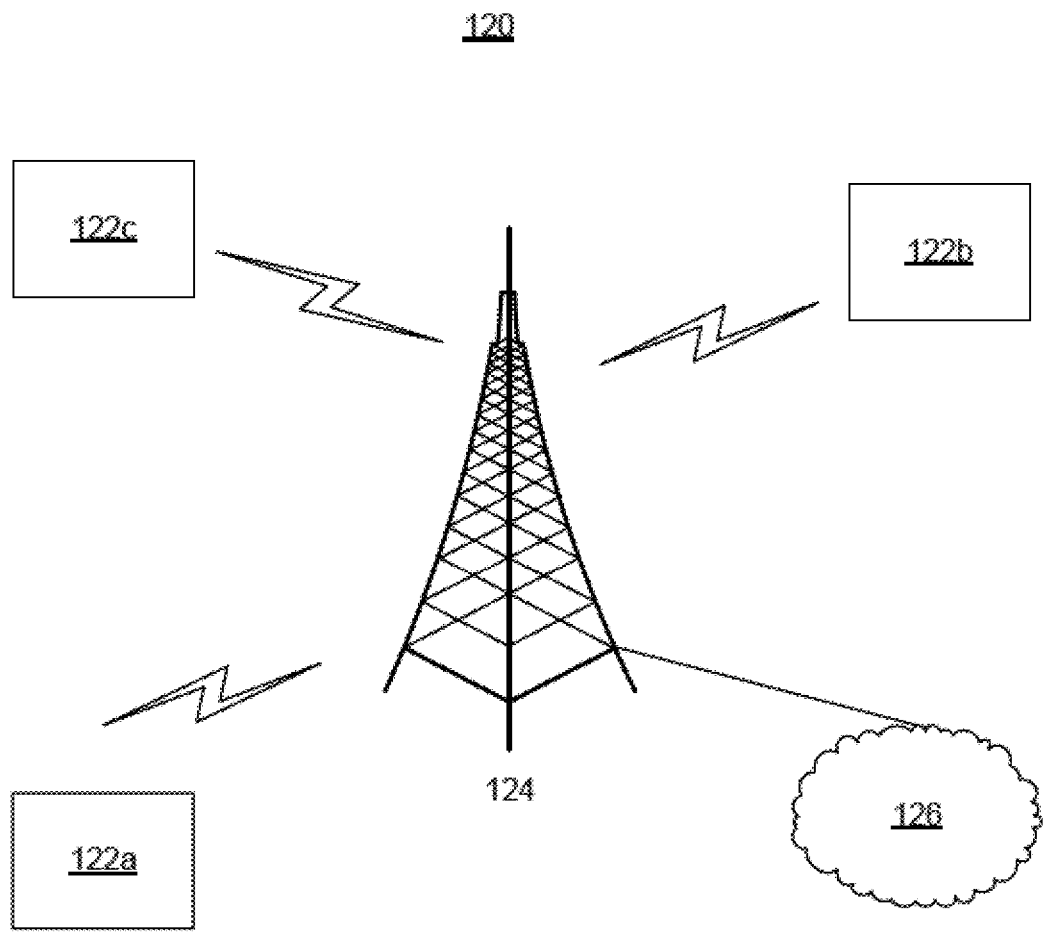
FIG. 1B is a high-level diagram of an example communications network.

FIG. 1A is a high-level block diagram of an example mobile device 100. Mobile device 100 may include a processor 102, a transceiver 104, one or more antenna 106, a user interface 108, a memory 110, and a power source 112. Mobile device may include other elements not shown such a global position device (GPS), among other things. The antenna 106 in conjunction with the transceiver 104 may be used to send and receive information to other devices over a communication link. A user interface 108 may include, for example, a display, a touch screen, and/or a keyboard, among other things. The power source 112 may be, for example, a rechargeable battery. Memory 110 may be volatile or non-volatile memory, for example. Mobile device 100 may be a smart phone, personal digital assistant (PDA), a mobile phone, a table, a wearable computer, or any device capable of collecting user data. FIG. 1B is a high-level diagram of an example communications network 120. The communications network 120 may include a base station or access point 124, which may communicate with one or more mobile devices 122a . . . c over a wireless communication link and provide mobile devices 122a . . . c with access to one or more network entities 126 including, but not limited to, a core network, a local network or the Internet.

Tracking the location of a user may be relevant for many applications. For example, the user's location aggregated over a year may be used to determine tax liabilities and manage tax compliance. In another example, the user's location may be used to detect credit card fraud. In another example, a user's location information may be relevant to track the movement of employees during deliveries or sales calls. In other example applications, a user's location information may be used for immigration compliance, field service and support, sales (including route optimization, performance and management), mileage tracking for tax deductions, establishing and proving employee presence in enterprise tax zones, and monitoring work-from-home employees, among other things. The systems and methods described herein focus on the example of tracking and gathering information for tax compliance for illustrative purposes, however, it is understood that the teachings herein may be used for any type of tracking, monitoring or compliance application, including those listed above. Herein, "compliance" systems and methods generally refer to a broad variety of applications including, but not limited to, regulatory compliance (e.g. tax compliance, immigration compliance, etc.), but also operations management (e.g. sales force task and operations management, employee work management, time and billing management, etc.). Moreover, in the description below, a "user" may refer to an individual, a business or enterprise, or an advisor, administrator or representative on behalf of a business or enterprise. Examples of advisors include, but are not limited to, financial advisors, tax advisors, legal advisors, immigration advisors, consultants, and managers.

Figure 2:
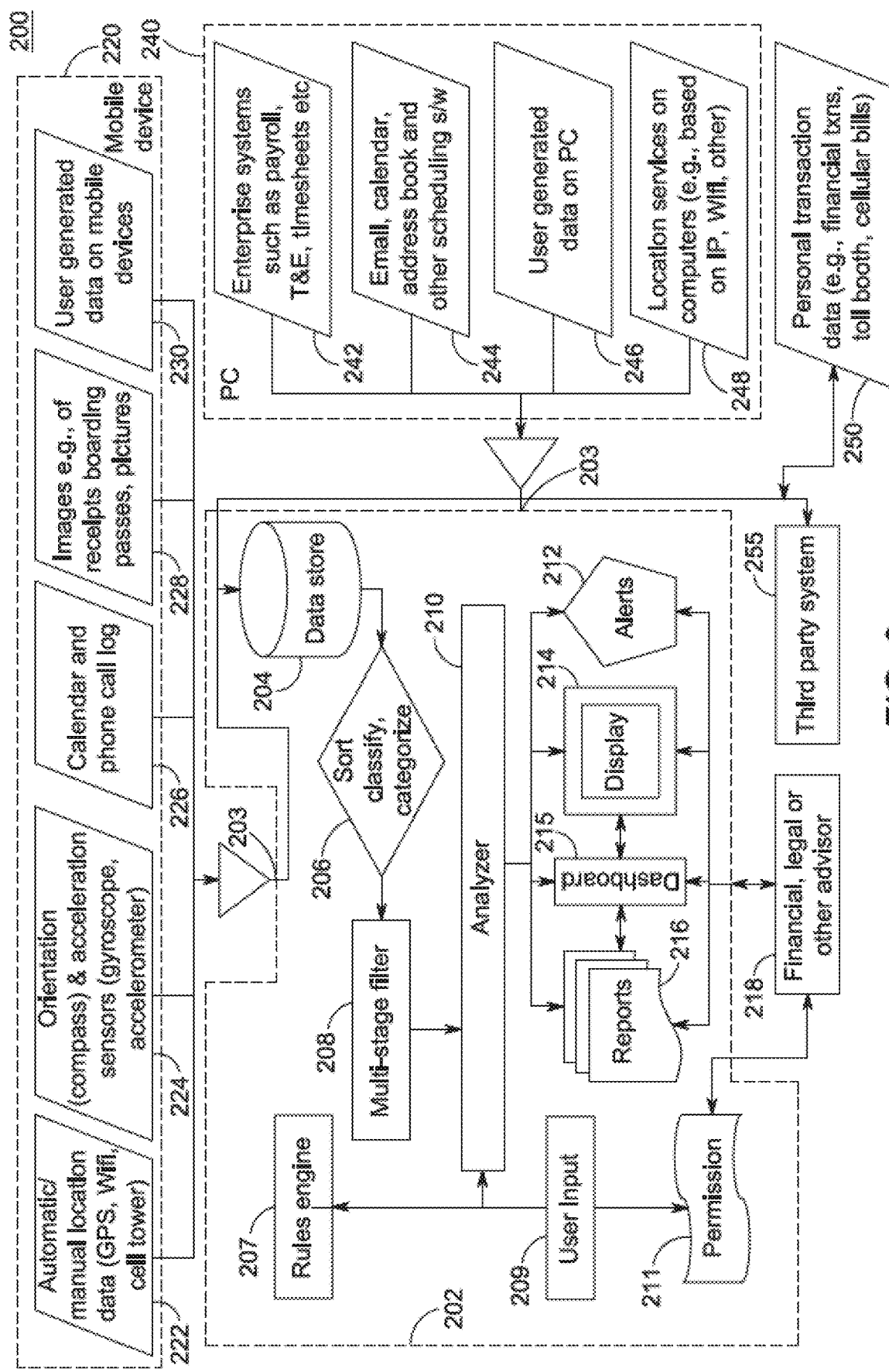
FIG. 2 shows an example communication system that includes an automated regulatory compliance system, in accordance with an embodiment.

FIG. 2 shows an example communication system 200 that includes an automated tax compliance system 202, in accordance with an embodiment. The automated tax compliance system 202 may automatically receive or capture information via an input interface 203 from any number or type of sources including, for example, from a mobile device 220, a personal computer (PC) 240, or any other device, embedded system or source of personal transaction data 250. For example, information may be received from an embedded system transplanted inside a person or a wearable computer (such as Google Glass® or Apple iWatch®). In other examples, information may be gathered from devices such as a global positioning systems (GPS) device (not shown), or a third party system 255. The automated tax compliance system 202 may exist or run on any device in the system 200, for example, handheld devices, personal computers, networks entities such as servers, base stations or core network, other existing platforms, generic devices, or custom devices built to capture information. The system 202 may therefore capture data from the device it is running on and/or from one or more external devices. For example, automated tax compliance system 202 may run on the mobile device 220 and interface internally with other programs running on the mobile device 220. In another example, system 202 may run on a network server and interface externally with the mobile device 220 for example, via a wireless communication system and the Internet.

The automated tax compliance system 202 may capture, record and/or monitor information on a persistent and continuous basis. Alternatively, the capturing, recording and/or monitoring of information may be done in response to certain event triggers including, but not limited to, a change in the user's location, time, vertical or horizontal accuracy of geo-location, or a user action. The automated tax compliance system 202 may be implemented, for example, in software executed by a processor in a device, such as any of the devices listed above. In an example, the automated tax compliance system 202 may be implemented as an application run by the processor of a smartphone (i.e. a smartphone "app"). In another example, the system 202 may be implemented in a computer or a distributed network of computers. In another example, the system 202 may be implemented in hardware or a combination of software and hardware.

The mobile device 220 may be, for example, a user's handheld device. Examples of handheld devices include, but or not limited to, mobile phones, smartphones, tablets, embedded systems, and wearable computers. The mobile device 220 may include a tracking data capture module 222, which may automatically or manually capture information such as tracking or location data. The tracking or location data may be collected via a number of methods including, but not limited to, internal or external global positioning system (GPS), Wi-Fi data, cell tower triangulation, and user generated location information. User generated location information may be captured and recorded as a "check-in" or by manual entry by the user. Moreover, other pieces of information may be gathered from a mobile device 220 to corroborate the location of an individual. For example, a mobile device 220 may include a compass, gyroscope and/or accelerometer 224 to generate orientation or compass data, gyroscope data, and/or accelerometer data. The mobile device 220 may include a calendar, electronic notes, emails and/or phone call log module 226 that may keep track of phone call records, notes, emails and/or mobile calendar entries to corroborate tracking data. An image storage module 228 may be used by users to store corroborating location information. For example, a user may take images of payment receipts, boarding passes, self-portraits (as a form of biometric authentication), or any other form of image to corroborate location information and store them in the image storage module 228. A user may use a storage module 230 to store user-generated data to corroborate location information. Additionally, data generated on mobile device 220 may not be stored locally but entered into mobile device 220 then transmitted and stored in a server system.

Information may also be extracted from other existing sources and provided to the system 202, including, but not limited to expense reports, travel systems, Internet protocol (IP) addresses in virtual private network (VPN) logs, and IP addresses in email headers or other sources. Information may also be acquired directly or indirectly from network carriers.

In an example embodiment, a user may download software implementing automated tax compliance system 202 onto a device, for example mobile device 220, capable of capturing tracking data, for example using tracking data capture module 222. In the example, the system 202 may be implemented as a software application run by a processor on mobile device 220. An example of tracking data may include latitude-longitude information. The system 202 may or may not run continuously in the background on the mobile device 220. In order to conserve power and processing cycles, the software application running system 202 may wake up automatically at predetermined time intervals or may be invoked by the user with or without alert from the system 202. In order to maintain continuous monitoring, the software running system 202 may start automatically after the boot-up of mobile device 220. Tracking data may be collected by system 202 from the device 220 at a default frequency or at a frequency determined by the user.

Figure 3:
FIG. 3 shows an example screen capture of a mobile device running an automated regulatory compliance system with periodic data tracking, in accordance with an embodiment.

FIG. 3 shows an example screen capture 300 of a mobile device runnmg an automated tax compliance system with periodic data tracking, in accordance with an embodiment. As shown in FIG. 3, the automated tax compliance system is configured to capture tracking data 305 at regular time intervals 310 of sixty minutes each. The time intervals 310 may be configured to any value. In an alternate embodiment, tracking data may be captured based on event triggers such as, for example, changes in location or user's choice of timing at which point alerts may be sent to the user prompting the user to input the data via check-in or manual input.

Referring back to FIG. 2, the tracking data may be processed by the software running system 202 on the device 220. In an alternative embodiment, the system 202 may run on the processor of a remote computer or server, such that the tracking information collected by the tracking data capture module 222 in the mobile device 220 (or, similarly, gathered by a personal computer (PC) 240 or any other device) may be provided for processing to the remote computer over a communication network.

System 202 may process the tracking data. For example, system 202 may use reverse geocoding of latitude-longitude measurements to convert the data into a human readable location format. In an example embodiment, tracking data may be synchronized from the mobile device 220 to a data store 204, which may exists, for example, on a server. The server may be locally or remotely hosted. The server may be managed by a service provider or a third party system 255. Data synchronization may occur on a periodic basis, or on demand. The frequency of data synchronization may be a default value or a user-defined value. Tracking data may be cached on the mobile device 220 for device power and data bandwidth management. Data synchronization may include sending additional data associated with the tracking data. For example, during synchronization, unique identifiers that reliably identify the devices, including, but not limited to, International Mobile Station Equipment Identity (IMEI), unique device identifier (UDID), mobile number, and medium access control (MAC) address may be transmitted to the server and associated with the tracking data.

A high accuracy time stamp may be assigned to the data captured and synchronized, and may not rely solely on the time set on the device 220. For example, the time stamp may be determined by utilizing universal clock time to avoid incorrect device time.

According to another example embodiment, tracking data may also be collected by running automated tax compliance system 202 as software on a user's personal computer(s) (PC) 240 and/or having a PC 240 directly communicating with a server or servers (not shown) that host enterprise information for multiple users. A location services module 248, located on one or more computers, may determine and keep track of location tracking data from, for example, Internet protocol (IP) addresses and Wi-Fi mapping, among other things. An email, calendar and address book module 244 may gather user-generated information from, for example, personal calendars, address books and scheduling software, among other things. A non-persistent systems tracking module 242 may gather tracking data from enterprise systems such as, for example, payroll, travel and expense (T & E) management systems, timesheets, time and billing systems, and various other enterprise systems collectively referred to as non-persistent systems. A storage module 246 may store and keep track of user-generated data on the PC 240.

According to another example embodiment, a user may download tracking data collecting software configured to perform the automated tax compliance system 202 onto a PC 240, to be run by a processor. Once downloaded, the software implementing system 202 may run in the background on the machine 240 and may periodically (for example, as defined by the user or the software), non-periodically, or based on certain event triggers, collect information from the user's non-persistent systems. The software may collect such data from services hosted by third parties such as, for example, a web-based calendar such as Google® calendar. Tracking data may be collected by reading the information stored in the non-persistent systems by accessing the non-persistent systems' database directly or through end points, such as application programming interfaces (APIs), provided by these systems. Such data may also be manually entered by the user into the software through a software portal which is accessible to the user.

In an example, data collected may be collated and stored in a local cache on the PC 240 until it is synchronized with a server. While information is stored in the local cache, the automated tax compliance system 202 may process this information. An example of such processing may involve classifying data from non-persistent systems (including, for example, payroll and timesheets) by time and date in order to create a timeline along which the various activities represented by the data occurred. The automated tax compliance system 202 may synchronize the changes in the data that may have occurred since the previous synchronization.

In an example embodiment, an automated tax compliance systems 202 running on a server may be capable of automatically gathering the user's information pertinent to tax filing from third party service providers both in electronic and non-electronic forms. Such information may consist of, for example, toll-booth records, financial transaction records, billing information from utilities, and other subscription services collectively called "transaction data".

In an embodiment, the user may provide the automated tax compliance system 202 access to electronic transaction data such as toll-booth information. Access may be granted by providing the credentials required to access an online transaction data account, which has the required transaction records. The automated tax compliance system 202 may be capable of reading data from these accounts by utilizing end points, such as APIs, provided by the providers or aggregators of such transaction data, or by algorithms, such as scrapers, that are a part of the software that can read transaction data from these accounts.

In another example, the user may be able to submit data via physical or electronic mailing systems to the automated tax compliance system 202. Such data may then be converted into electronic records by the automated tax compliance system 202. For example, the automated tax compliance system 202 may utilize scanners, which can read printed documents on physical media such as paper. In another example, the automated tax compliance system 202 may utilize drive readers which can read files from data storage devices, such as USE drives. This data may then be processed, for example by using optical character recognition, facial recognition, or other similar modalities in order to convert the data into a format that maybe more easily stored.

In another example embodiment, the automated tax compliance system 202 may be able to access electronic and non-electronic user generated content. Such data may include images denoted by the user for example, of themselves, receipt, boarding pass, other images, announcements of the user's current location for example through check-in services that allow such an action such as, but not limited to, Facebook®, and Foursquare®, among others. Such data may be generated by the user in any way including but not limited to devices, machines, and in non-electronic forms such as diaries or journals.

In the following, the automated tax compliance system 202 of FIG. 2 is described. With reference to FIG. 2, information gathered from different data sources, as described above, may be stored in a data store 204 such as, for example, a database. A data sorting module 206 may be built into systems 202 and may be used to perform a number of transformations on the data including sorting, classifying, and categorizing the information collected. A multi-stage filter 208 may be applied to cleanse the data and to purge duplicate records. In another example, no filtering may be used such that all the data is saved and/or used by the system 202.

According to an example, the data store 204 may be a third party database such as MongoDB®, MySQL®, or any other commercially available databases. These databases may be hosted on a server and may be accessible by all parts of the automated tax compliance system 202. An example of filtering performed by the multi-stage filter 208 may be going through collected data to combine multiple records, such as multiple location latitude-longitude coordinates submitted in a short duration of time. The automated tax compliance system 202 may not need to utilize all of these coordinates, and may determine which of the multiple entries in a specified duration are most relevant. The non-relevant entries may be marked as not being used for further processing. Filtering may also exclude information that is incomplete, or is determined to be incorrect based on certain criteria. For example, in the case of tracking data, incorrect data may be determined by analyzing the horizontal accuracy of such data. Filtering may be performed by multi-stage filter 208 as the first step after the data is saved in the data store 204 to keep the data set manageable, and to increase processing efficiency.

A tax rules engine 207, which may be for example a software module, may run on servers located within the service provider or a third party system 255 or on any device. For example, the tax rules engine 207 may include organized detailed information about tax rules in various tax jurisdictions. Such tax information may be regularly updated either manually or automatically either by a tax service provider or through third party systems 255. These rules may pertain to various facets of tax law including, but not limited to, tax rates, residency rules and relevant definitions, foreign income exclusion rules and definitions, and permanent establishment rules and definitions.

Figure 4:
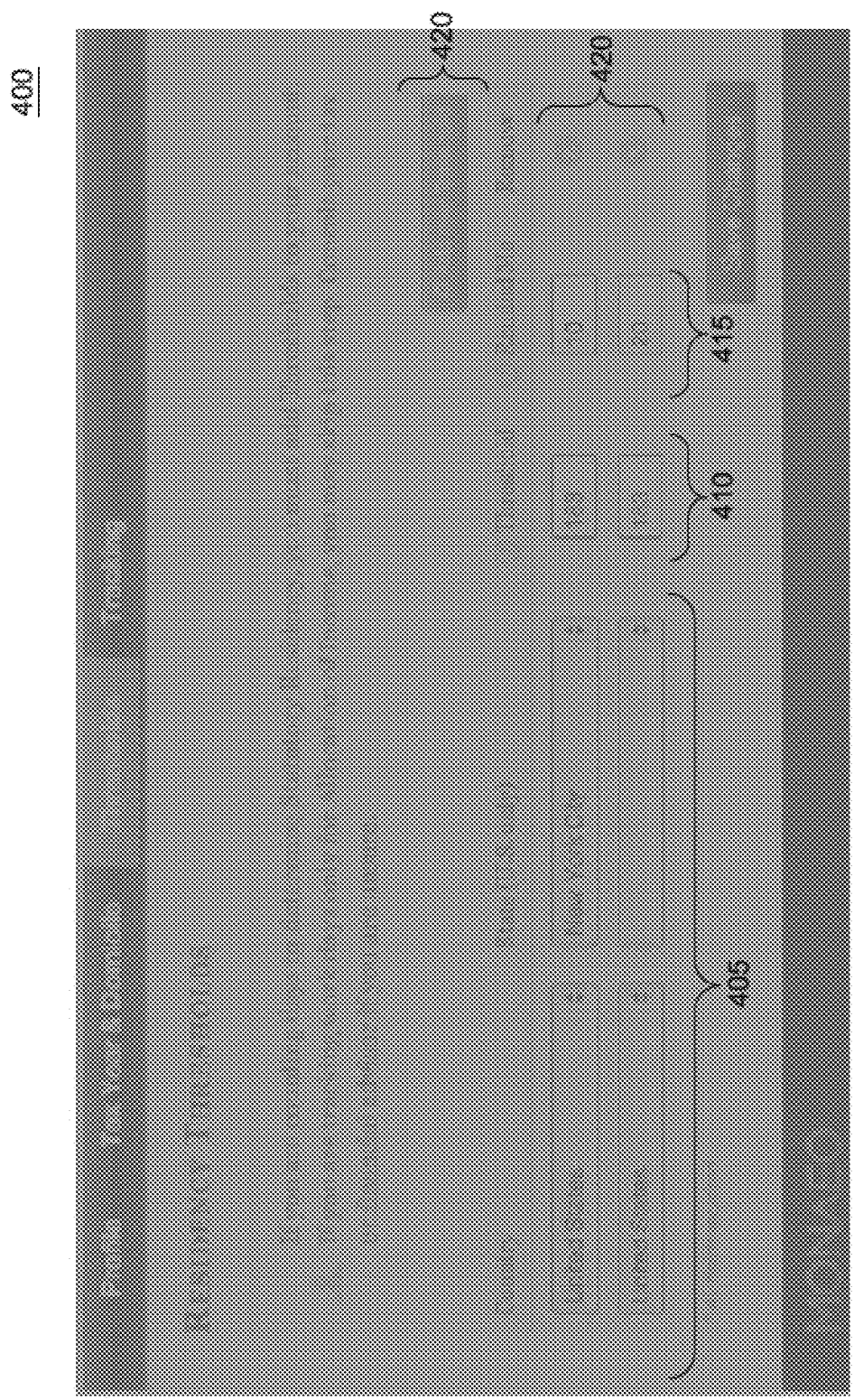
FIG. 4 shows an example screen capture of an automated regulatory compliance & optimization application that provides residency rules and reminders for a regulatory jurisdiction, in accordance with an embodiment.

In an example embodiment, the tax rules engine 207 may contain information on several different facets of personal and enterprise taxes, one example of which may be residency rules for different tax jurisdictions, such as the threshold number of days that a taxpayer cannot be in the jurisdiction without triggering additional tax liabilities. FIG. 4 shows an example screen capture 400 of an automated tax compliance application that provides residency rules and reminders for a tax jurisdiction, in accordance with an embodiment. In the example of FIG. 4, a given tax jurisdiction 405 (e.g. New York City) may have an associated threshold value 410 in terms of number of days (e.g. 183 days) based on the statutory limitations. A user can set a reminder value 415 in terms of number of days relative to the corresponding threshold value 410. A user can manually add or remove jurisdictions 420. Another example might include the various treaties between different tax jurisdictions in order to deduct such additional liabilities. With reference to FIG. 2, the tax rules engine 207 may store the rules in the data store 204 in a sequential or non-sequential database.

Referring to FIG. 2, the Analyzer 210 may be capable of taking the tracking data as an input and applying information from the rules engine 207 to perform calculations to calculate tax implication from the data collected across different tax jurisdictions. The analyzer 210 may generate paper and electronic reports that users may access from any form factor that may allow access to such reports. The analyzer 210 may also send recommendations and alerts (via alert module 212) to users in order to provide decision-making and informational tools to the users so they may better plan and prepare for tax liabilities for either themselves and/or a business or enterprise.

According to another example embodiment, the analyzer 210 may count the number of days that a taxpayer has spent in different tax jurisdictions. For example, the rules engine 207 may provide the definition of a day. For example, a day in New York may be defined as being present in a location at any point in the day versus the definition of a day in the United Kingdom, which may be defined as staying in that location overnight. The analyzer 210 may perform complex calculations such as taking into account various factors including, but not limited to, changes in time zones, multiple time zones within a country, day light savings, and leap years, for example. The data collected and the calculations performed by the analyzer 210 may form the basis for generating reports 216. The reports 216, for example, may provide a user or enterprise with better tax management and compliance. Such reports 216 may come in a number of different formats and may contain different data depending on the needs of the user or enterprise. The reports may be provided to an administrator, financial or legal advisor, or an accounting, tax, HR or payroll management system for the enterprise, among other examples.

Figure 5:
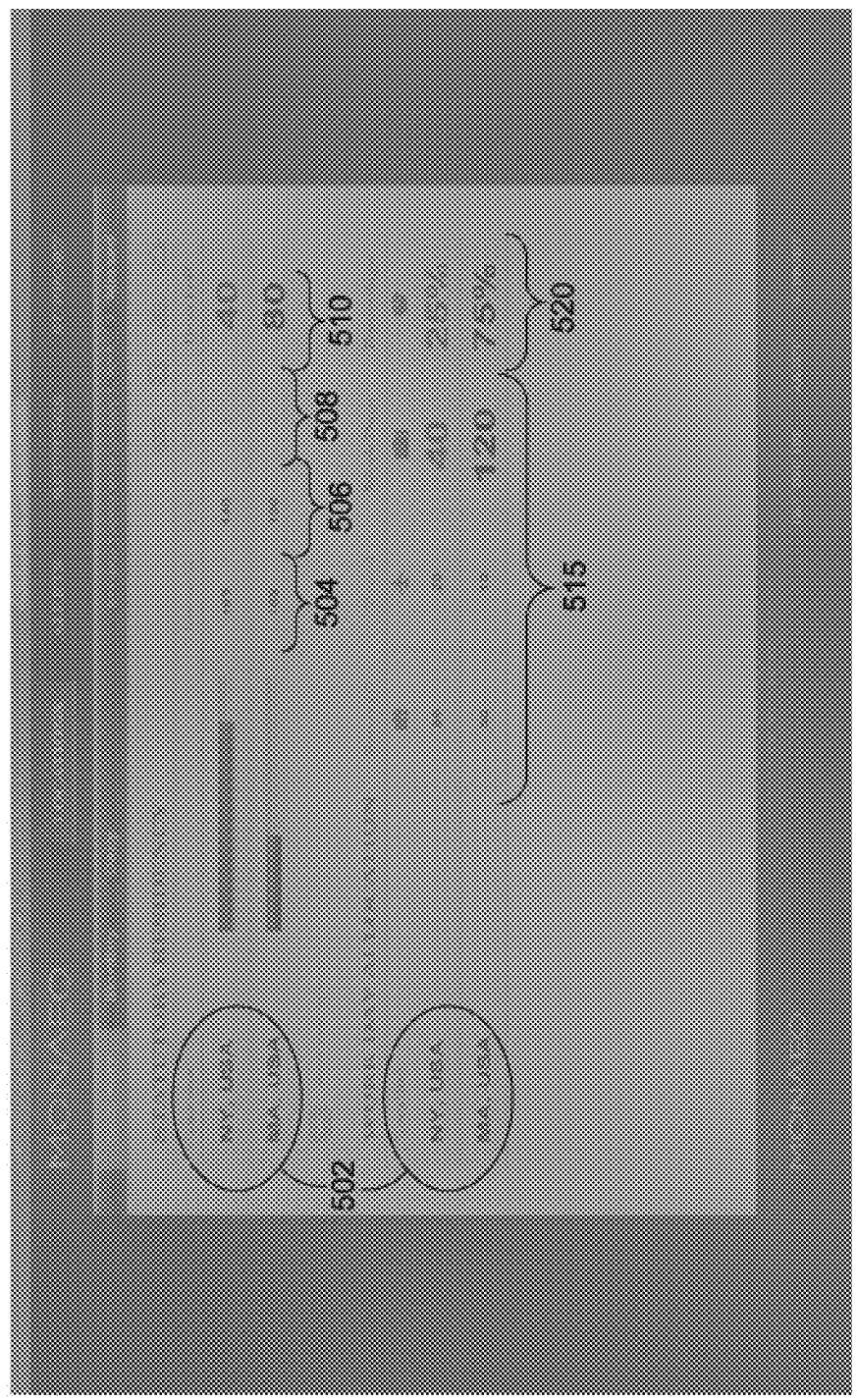
FIG. 5 shows an example of a summary report, in accordance with an embodiment.

FIG. 5 shows an example of a summary report 500, in accordance with an embodiment. The report 500 may show for each jurisdiction 502, the threshold value 504, the days spent 506, the days missed 508 and days left 510 in a given jurisdictions of users choice. Such a report may also have the sum total of the work day allocation 515 for each jurisdiction 502, providing the number of days that the user was in different jurisdictions for work, personal, or transit, and a percentage of time spent for work 520.

Referring back to FIG. 2, in accordance with an exemplary embodiment, the determination of the values in report 216 may be made by a combination of rules from the rules engine 207, and data collected from various sources and user input/confirmation 209. As an example, New York may allow the exclusion of transit days from the total number of days that count towards the establishment of residency in the State. The analyzer 210 may request the definition of this rule for New York from the data store 204 and based on the time, location, calendar, itinerary, credit card and other data, the analyzer 210 may determine whether the user was transiting through New York.

Figure 6:
FIG. 6 shows an example of a monthly report, in accordance with an embodiment.

FIG. 6 shows an example of a monthly report 600, in accordance with an embodiment. According to the example of FIG. 6, the monthly report 600 may show all the different tax jurisdictions 602 that the user has been to for a given date 604, for every day of every month in the year. Report 600 may provide other information for each entry such as, for example, the source of the data 606, the day type 608 (e.g. work/personal/travel), notes 610, and the ability to edit or delete an entry 612.

Figure 7:
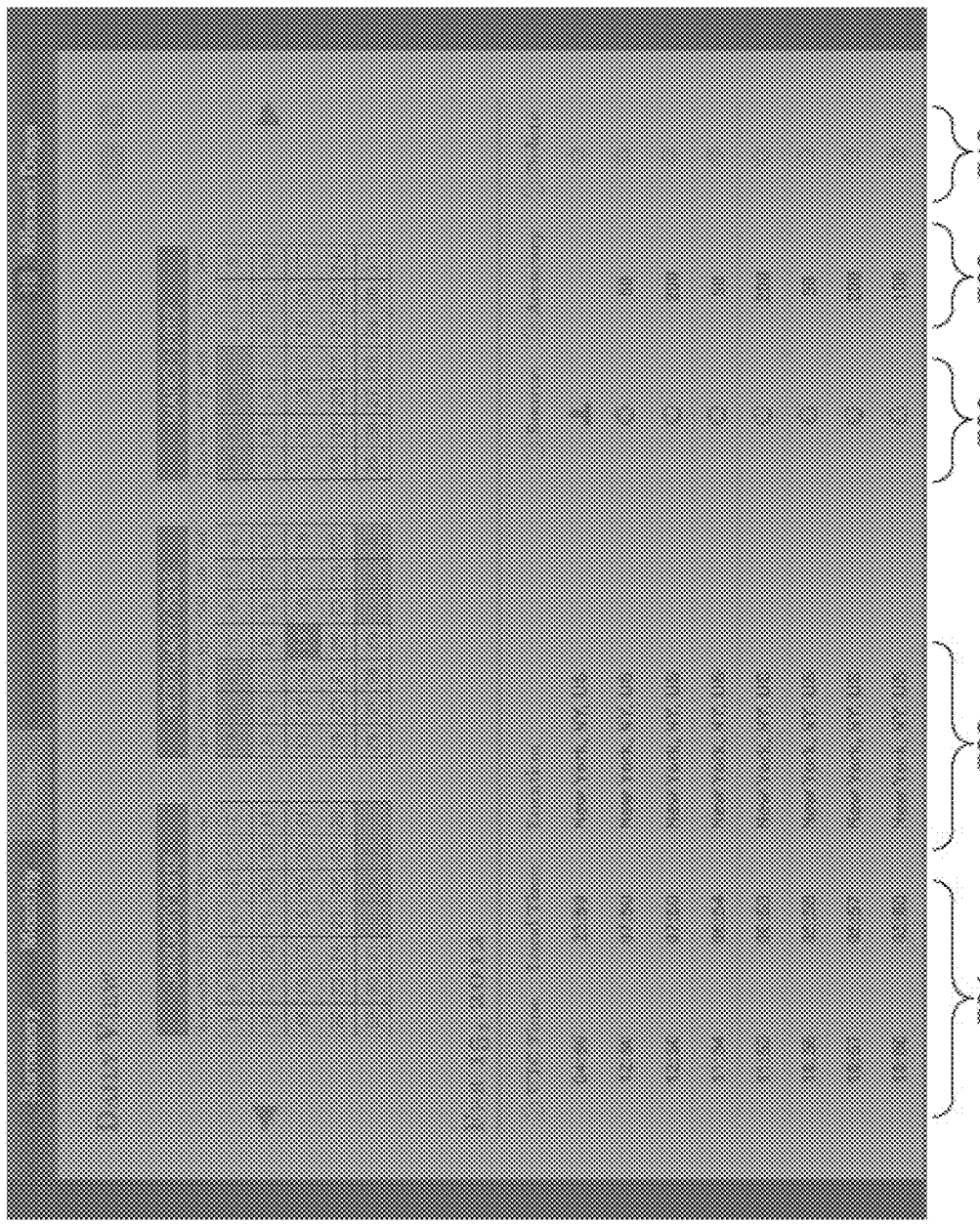
FIG. 7 shows an example of a daily report, in accordance with an embodiment.
Figure 8B:
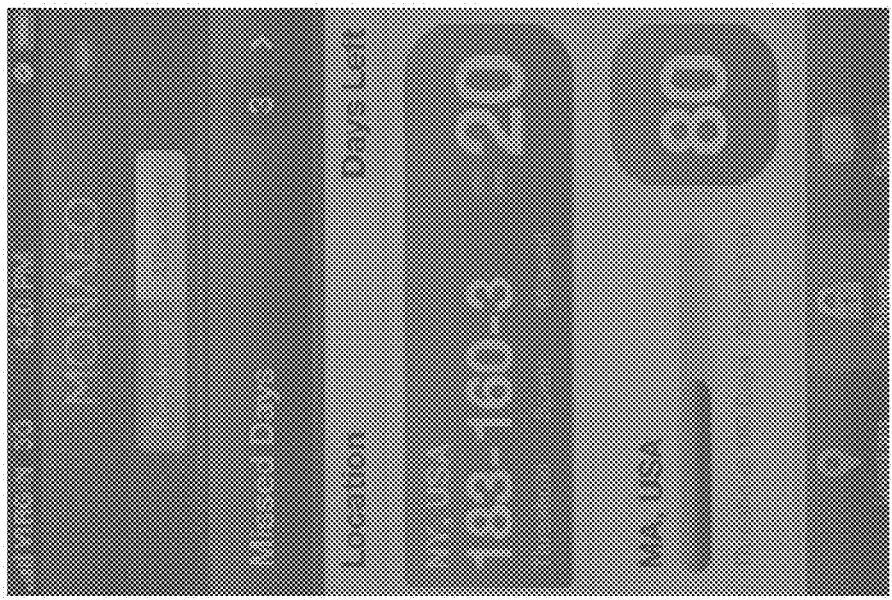
FIG. 8B shows an example screenshot of record keeping of a user's location, in accordance with an embodiment.
Figure 8A:
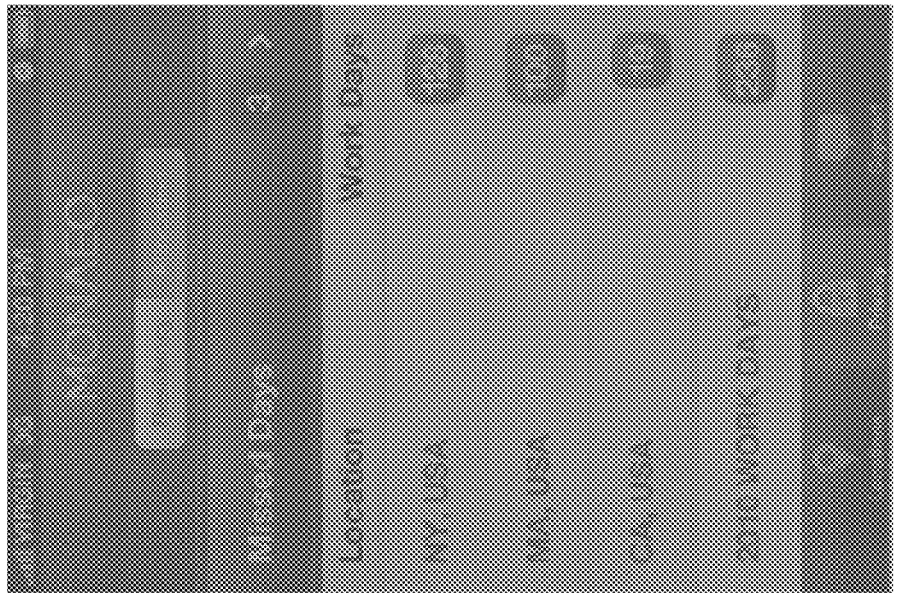
FIG. 8A shows an example screenshot illustrating a user alert provided by an automated regulatory compliance & optimization application, in accordance with an embodiment.

FIG. 7 shows an example of a daily report 700, in accordance with an embodiment. In the example of FIG. 7, the user's location 702 is recorded with respect to a time value 704, where location values 702 are shown to be stored on an hourly basis. Report 700 may provide other information for each entry such as, for example, the source of the data 706, an accuracy value 708, and the ability to edit or delete an entry 710.

Referring to FIG. 2, several other forms of reports 216 with information of varying degree of detail may be made available depending on the needs and application of the user or enterprise. In an example, reports 216 may be made accessible to third parties 218 such as the tax department, advisors and assistants in printed form or through a portal that the authorized third parties may have login access. Such reports 216 may be used to perform tax calculations, compliance, and audit defense, among other things. In examples involving an enterprise, reports 216 may be provided to management systems such as, but not limited to, Nexus, payroll withholding, time management systems, financial management systems, and tax management systems, or provided directly to a legal entity or employee.

Calculations from the analyzer 210 may also be used to generate alerts 212 for the user to prevent the occurrence of events that may result in additional tax liabilities. Alerts may be provided to a user or enterprise (for example, an administrator) via electronic message including, but not limited to, email, push notification, and/or non-electronic messages such as a letter or phone call. Figure SA shows an example screenshot illustrating a user alert provided by an automated tax compliance application, in accordance with an embodiment. In the example of Figure SA, a user may use an automated tax compliance system, as described above, to prevent spending more than the threshold value number of days in a jurisdiction. In this example, the threshold is shown to be 183 days in New York, and an alert is shown when there are only 20 days left. Figure SB shows an example screenshot of record keeping of a user's location, in accordance with an embodiment. In the example of Figure SB, a number of workdays may be recorded for each jurisdiction where the user has been (New York, Massachusetts, and California, in this example). Any definition of workday may be used, for example, a week day that is not a holiday. A user may manually set any day to be a personal, work or transit day.

Figure 9:
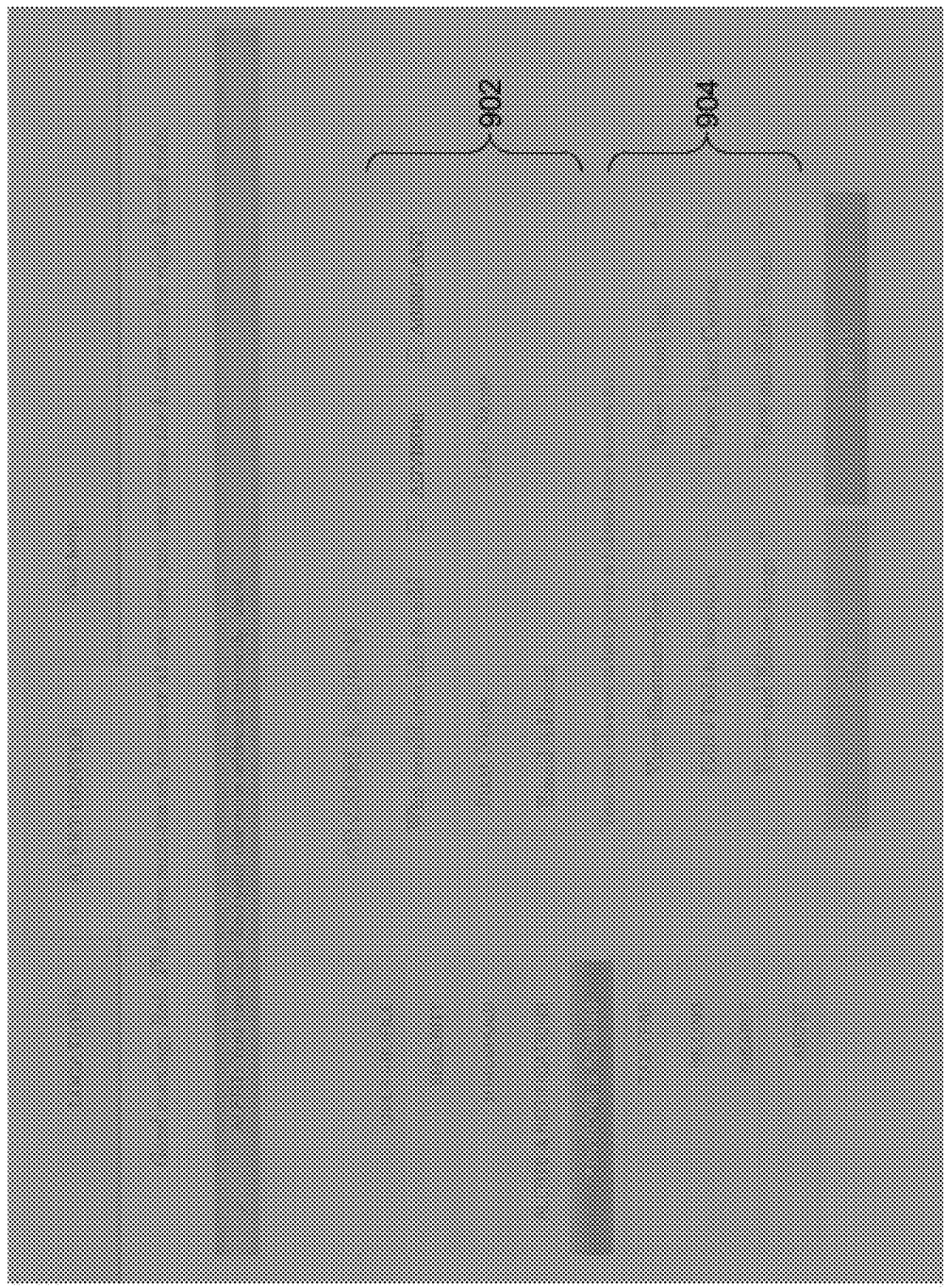
FIG. 9 shows an example interface for setting alert configurations, in accordance with an embodiment.

FIG. 9 shows an example interface 900 for setting alert configurations, in accordance with an embodiment. The alerts may be configurable by a user or administrator to suit their needs, for example, by setting the recipient of the alert reminder (902), and the information the recipient has access to (904). Additionally, the frequency and method for alert may be configured by a user or administrator. Such alerts may enable a user or an enterprise to track activity and prevent triggering tax rules that may result in avoidable financial loss.

Referring back to FIG. 2, in the event the rules are open to interpretation or there may be multiple outcomes based on the data and rules in the automated tax compliance system 202, the analyzer 210 may be able to use pattern recognition to make recommendations to the user, where the user may be a financial advisor or administrator on behalf of an enterprise. The user may have the option to choose whether the system 202 makes such decisions based on these patterns or if the system 202 should show the user or others authorized by the user, all potential different options for selection. In this regard, the system 202 may be designed to provide the user full flexibility by providing access to configurable settings on the system 202.

In an example embodiment, the system 202 may use machine learning algorithms to make recommendations where necessary and may require user input for example, to determine if the person was in transit, or was taking a vacation or sick day. The system 202 may use information collected in the past and may apply algorithms to make predictions.

Figure 10:
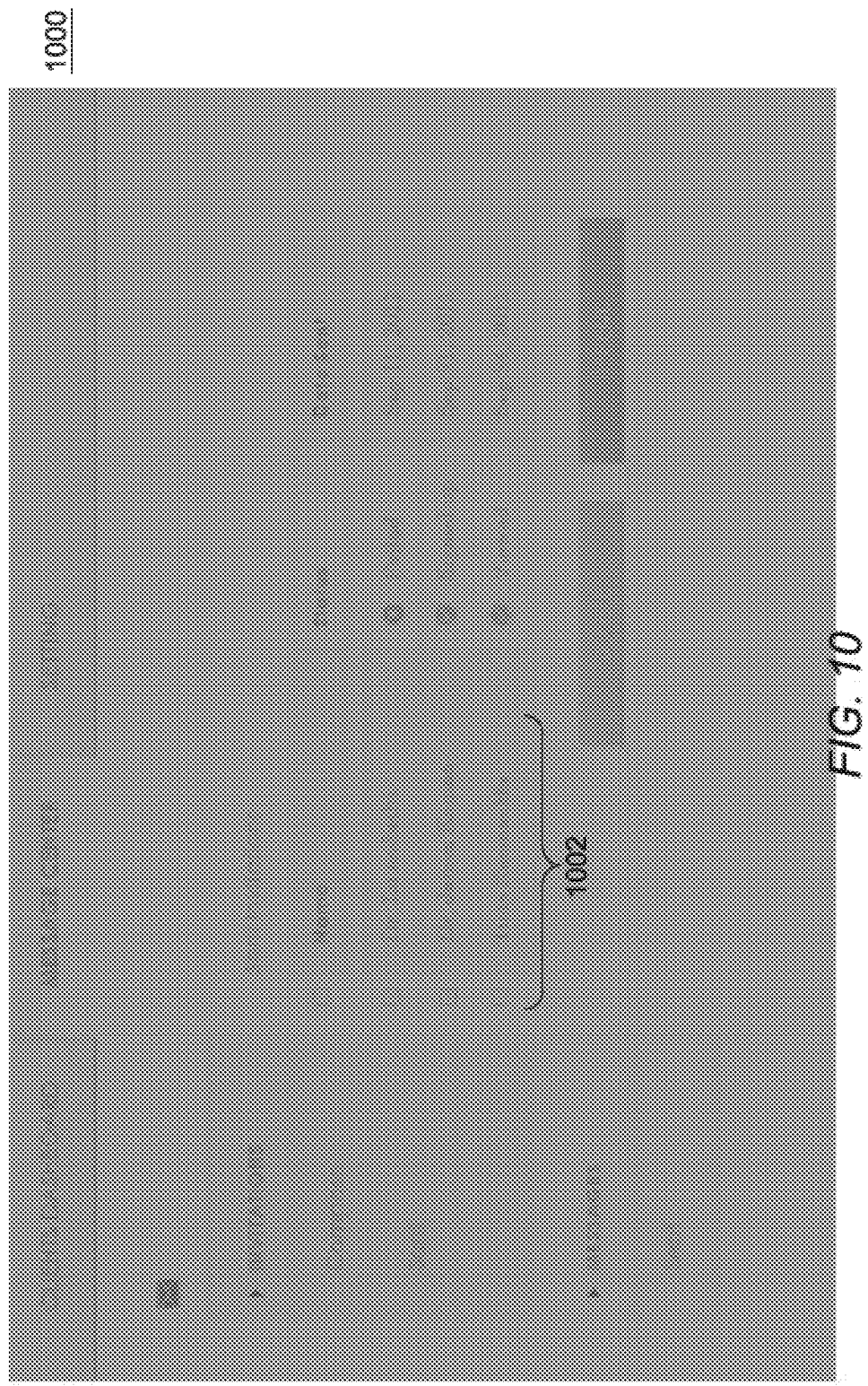
FIGS. 10 and 11 show examples of dashboards, in accordance with an embodiment.

The system 202 may provide the capability of having an administrator account for users such as financial advisors, HR managers, tax managers, chief financial officers (CFOs), assistants or other individuals in other functional roles that may want to manage one or more users. Users or administrators may interface with the automated tax compliance system 202 via, for example, some kind of display 214, such as a computer or handheld device screen. The display 214 may be used to provide a portal or dashboard 215 for access by users and/or administrators. FIG. 10 shows an example of a dashboard 1000, in accordance with an embodiment. The dashboard 1000, via a configurable list of users 1002, may allow an administrator or user to view, edit, collate and share the information, reports and alerts for any number of users. The dashboard 1000 may provide a user the ability to provide access to such administrator accounts to one or more authorized users.

Figure 11:
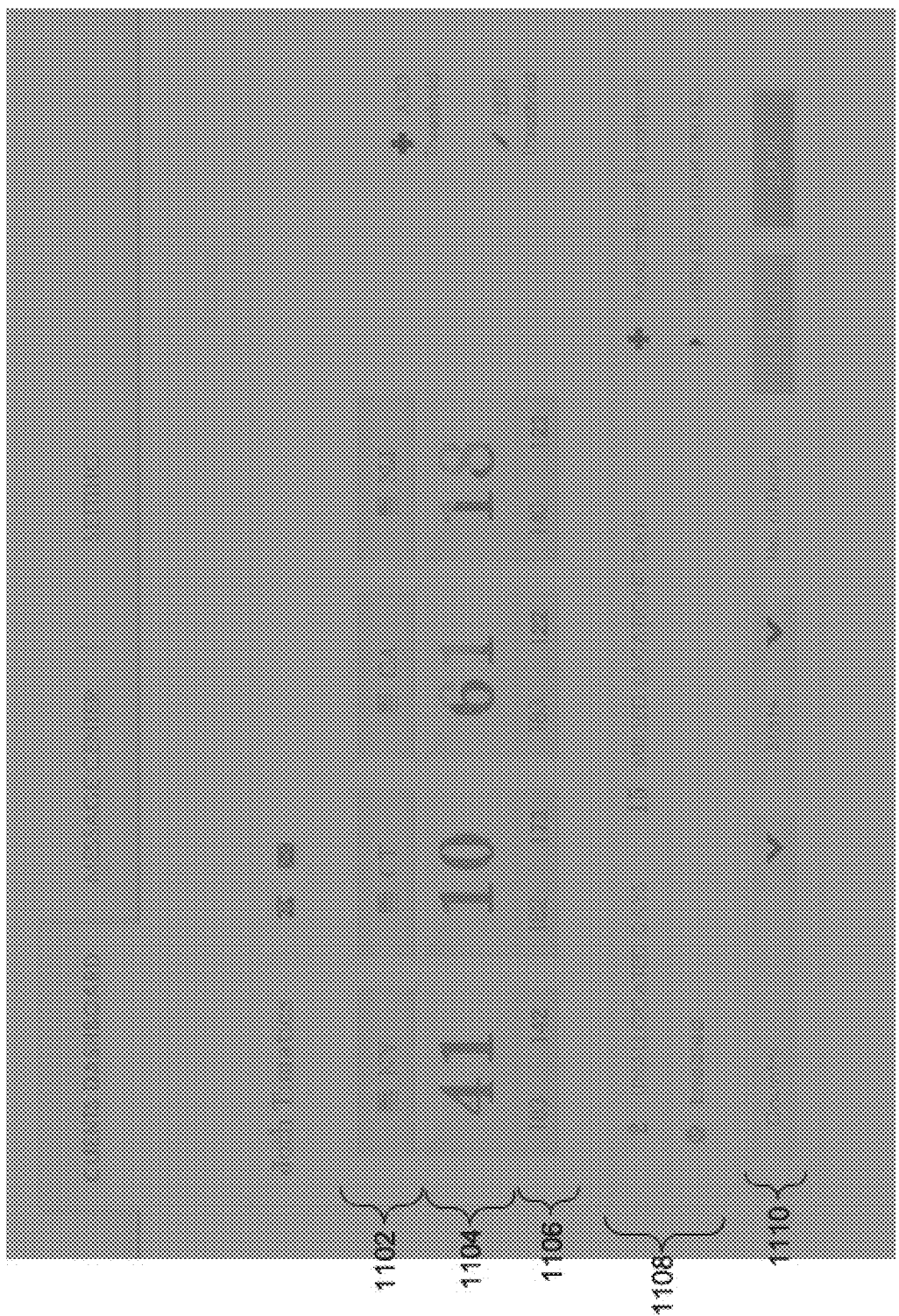

According to an embodiment, with reference to FIG. 2, the dashboard 215 may be a module within the system 202. The dashboard 215 may run on servers and may have access to the data store 204, rules engine 207, analyzer 210, and other modules. The dashboard 215 may be used, for example, by a tax advisor who wants to keep track of multiple clients, and the number of days that his clients may be spending in different tax jurisdictions or by a payroll manager at a company who wants to keep track of multiple employees, and the number of days that each employee may be spending in different tax jurisdictions. FIG. 11 shows an example dashboard 1100, in accordance with an embodiment. In the example, dashboard 1100 may display various jurisdictions 1102, the associated number of days spent in the jurisdictions 1104, threshold information 1106 based on statutory limits, other tracking information 1108. Dashboard 1100 provides a means for adding or deleting jurisdictions 1110. Threshold values may be entered manually or may be automatically retrieved from a rules engine (such as rules engine 207 of FIG. 2).

With reference to FIG. 2, the dashboard 215 may be configured for an advisor 218 to receive alerts 212 from system 202 so that the advisor 218 may be able to provide early warning to clients, for example. In another example, the dashboard 215 may be used by the advisor 218 to access reports 216 to do regular tax filing calculations. Although only certain arrows are shown in the example of FIG. 2, any of the modules of automated tax compliance system 202 may interact with each other. For example, dashboard 215 may exchange information directly with rules engine 207, and alert module 212.

According to another example embodiment, an automated compliance system, such as system 202 in FIG. 2, may be utilized for immigration, nationalization, and/or travel related applications. For example, the system 202 may provide the user an alert via alert module 212 when the user may be coming close to the number of days that the user may legally spend in a country. For example, a visitor from Europe may not be allowed to stay more than six months in the United States on a travel visa. The alert module 212 may issue an alert to warn the user to leave the country when his/her stay is coming close to the allowed limit.

According to another example embodiment, alert module 212 may generate alerts to capture re-entry rules pertaining to immigration laws in different countries such as, but not limited to: restrictions for coming back into a country within a specified time period; restrictions on when a user's stay in a country may be expiring based on the country's immigration rules; and assistance for initiating permanent residency or citizenship procedures based on factors not limited to the count of days that the user has spent in the country in question, for example.

According to another example embodiment, system 202 may be used to prevent and alert a user and their financial institution from transaction fraud, such as in the case of credit cards by comparing information pertaining to the financial transaction in real time with the user's location and other pertinent information.

According to another example embodiment, the system 202 may link with a third party 255, such as a credit card company or a service that is able to obtain similar information from one or more credit card companies, and may compare the location information for the financial transaction with the location information collected by the system 202. Such comparison may be used by alert module 212 to generate an alert indicating potential fraud that may be sent to, for example, the user, a third party 255 such as a credit card company.

According to another example embodiment, the system 202 may be used in sales force optimization, compensation, and other use cases associated with management of a sales force. For example, the system 202 may reliably tell a sales person where they are spending more time and providing them analysis, reports 216 and alerts via alert module 212 based on sales goals, which may be provided by a user. The system 202 may also be used by a sales manager to effectively monitor using credible data to do sales force deployment, re-deployment, sales quota setting, compensation calculation, service and support optimization, and mileage tracking among other activities.

Figure 12:
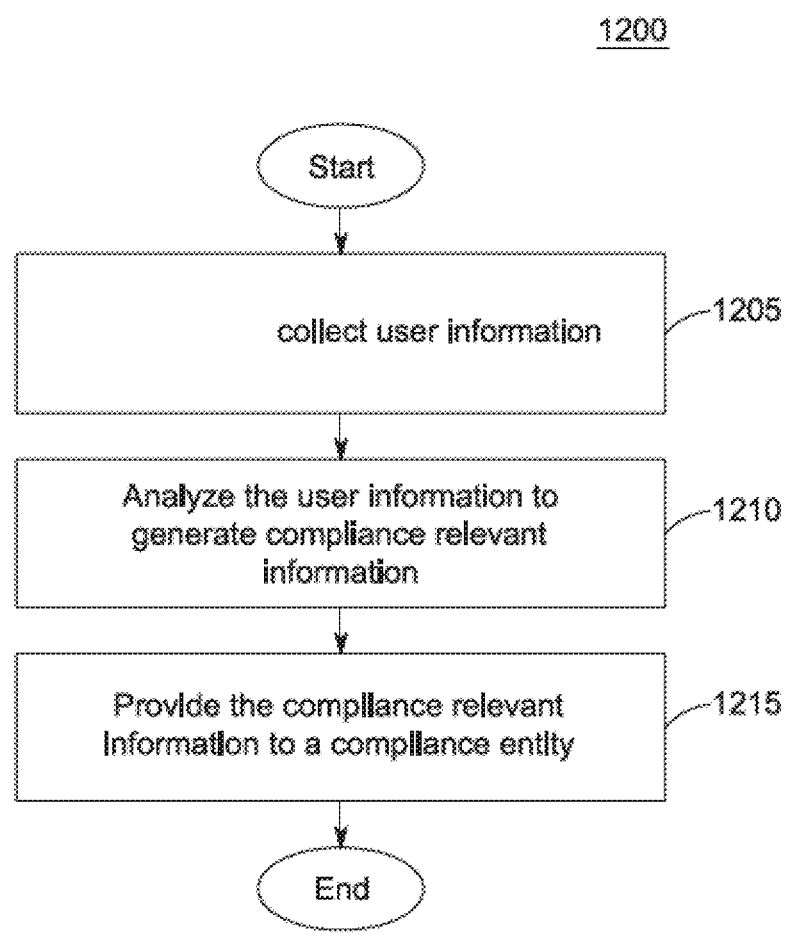
FIG. 12 shows a high-level block diagram of an automated compliance method, in accordance with an exemplary embodiment.

FIG. 12 shows a high-level block diagram of an automated compliance method 1200, in accordance with an exemplary embodiment. User information may be collected, 1205. The information may be collected automatically, continuously, periodically, or based on event triggers, for example. For example, where the information is collected in a mobile or handheld device, method 1200 may be implemented as an application that runs continuously in the background to collect relevant data. The method 1200 may run even with the application associated with the data collection is closed on the mobile device by the user. This data collection may be optimized to save battery life using wake and sleep periods. Examples of user information collected by the application may include any of the information discussed above, such as geo-location information. The application may collect data systematically or non-systematically, and/or with user prompting or input.

The user information may be analyzed to generate compliance—relevant information, 1210. Compliance information may generally refer to information for any type compliance, operations, optimization or decision support, including the example applications discussed herein. The compliance-relevant information may be provided to a compliance entity, 1215. A compliance entity may be the user, an administrator, a financial advisor, an employer or employer system such as payroll or time management systems, or any other examples discussed above. Additionally, any of the examples or techniques described herein may be performed by method 1200. For example, any of the embodiments described with respect to automated compliance system 202 of FIG. 2 may be implemented as part of method 1200 of FIG. 12.

The following describes example embodiments pertaining to enterprise applications. An automated compliance system or method, for example the system 202 described in FIG. 2 or equivalently the method 1200 of FIG. 12, may be used by a business, company or enterprise for compliance purposes, where compliance here broadly includes applications pertaining to regulatory compliance, operations management and optimization. Employers, administrators, advisors, managers or others within or outside but affiliated to the enterprise may be given selective access to the system and user information for the purpose of, for example, multi jurisdictional tax risk management, compiling of audit evidence or other financial or liability risk management. The automated compliance system may be used to maintain employee location visibility; however, filtering, cleansing, and aggregation of information may be used to maintain a degree of employee privacy. The system may be useful for various tax implications for an enterprise, including, but not limited to: local tax accounting, non-resident payroll withholding, Nexus, permanent establishment, state apportionment of corporate taxes, avoiding tax overpayment, and deferred compensation accounting.

In an example, privacy may be achieved by g1vmg employees full control of their personal location (or other) information, for example via an application or console. Data may be provided to the automated compliance system in an aggregated reporting format, for example, by jurisdiction, coarse location, ratios, logs, or department, among others. Additionally, high levels of security and encryption may be provided. Settings of the automated compliance system may be configured by an administrator or user, and employees may obtain or be authorized to the system via email or short message service (SMS) on their mobile device, for example. Employees may be able to download a (free) mobile application for easy access to the automated tax compliance system. Employees can use the application to manage settings, report data automatically or manually, and review information prior to submission.

Figure 13:
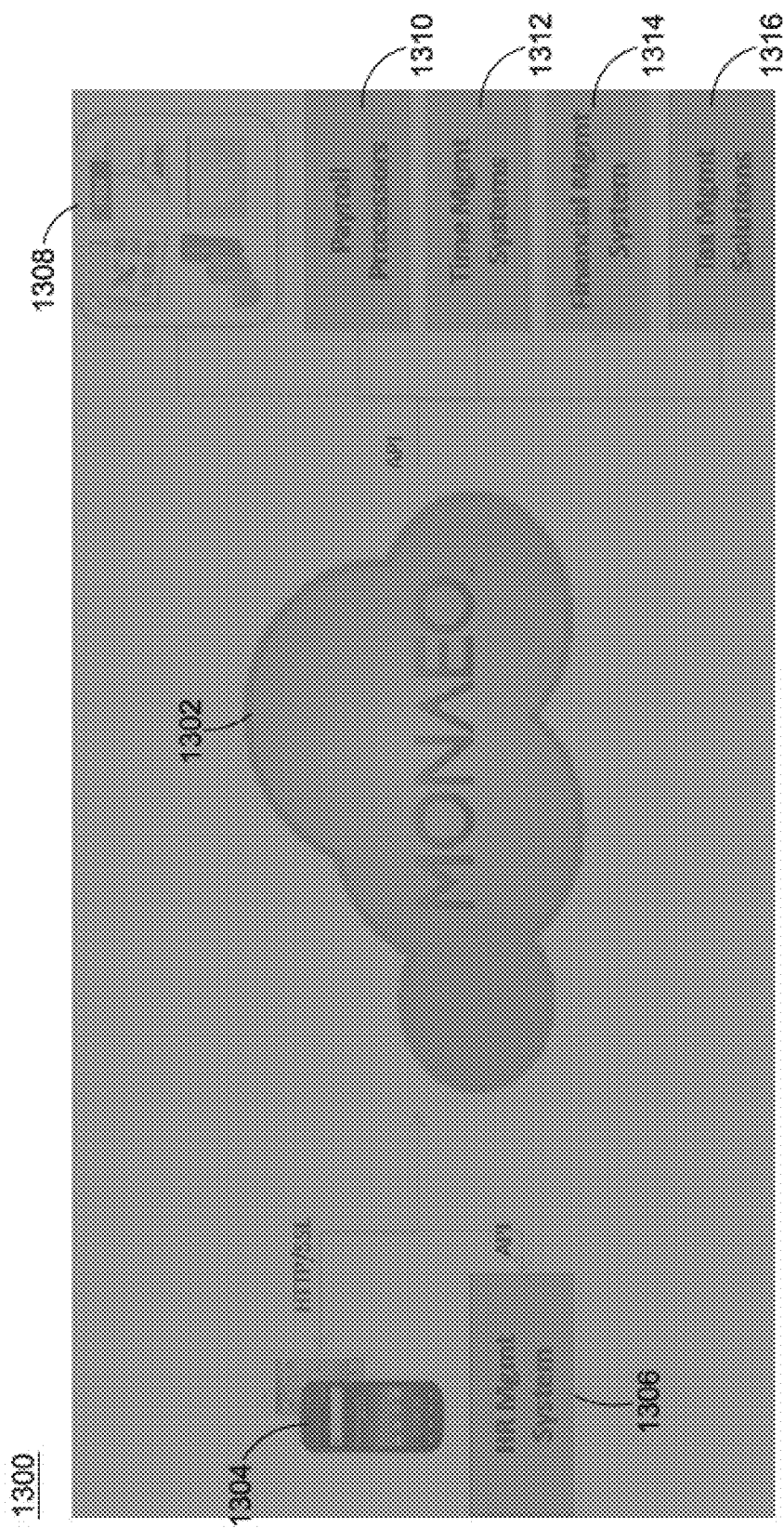
FIG. 13 shows an example of a system integration of an automated compliance system with other management systems within an enterprise, in accordance with an embodiment.

FIG. 13 shows an example of a system integration 1300 of an automated compliance system 1302 with other management systems within an enterprise, in accordance with an embodiment. The automated compliance system 1302 may be implemented, for example, as a cloud-based platform with open APIs for integration with existing programs, systems and third party software. The automated compliance system 1302, may interface with users 1304 for example, via mobile device or computer 1304, and the enterprises HR personnel and/or management systems 1306 to receive compliance relevant information. The automated compliance system 1302 may process the information, for example using techniques disclosed herein, and report relevant compliance information to systems, devices or entities involved in various aspects of management of the enterprise, including, but not limited to: payroll processors 1310, time management systems 1312, financial management systems 1314, tax management systems 1316, or direct reports 1308, for example to an advisor, administrator or other service or entity.

For example, in the case of time management systems 1312, time sheets may be generated manually by providing forms to employees within a company to enter information on a daily basis. Alternatively, the time management system 1312 may be automated, such that system 1312 may predict the location and number of hours worked by an employee report may be generated by system 1312 and presented to the employee for review and approval, and may be made available on the web or a mobile device application. Such a report may include, for example, a table of locations versus days worked, with entries m the table indicating when and where the employee has worked. Such a time-management system 1312 may be used to assist in or replace a manual approach of completing periodic timesheets as part of time and billing or other processes for service professionals including, but not limited to, management consultants, accountants, lawyers, and other consultants. Such a time management system 1312 may be used to keep track of temporary workers to determine the number of hours work for compensation, for example. Time management system 1312 may determine when a worker is needed at a work location and how many hours the worker was at a location, and may be used in place of punch cards to determine when a worker arrives at and leaves a work location.

Figure 14:
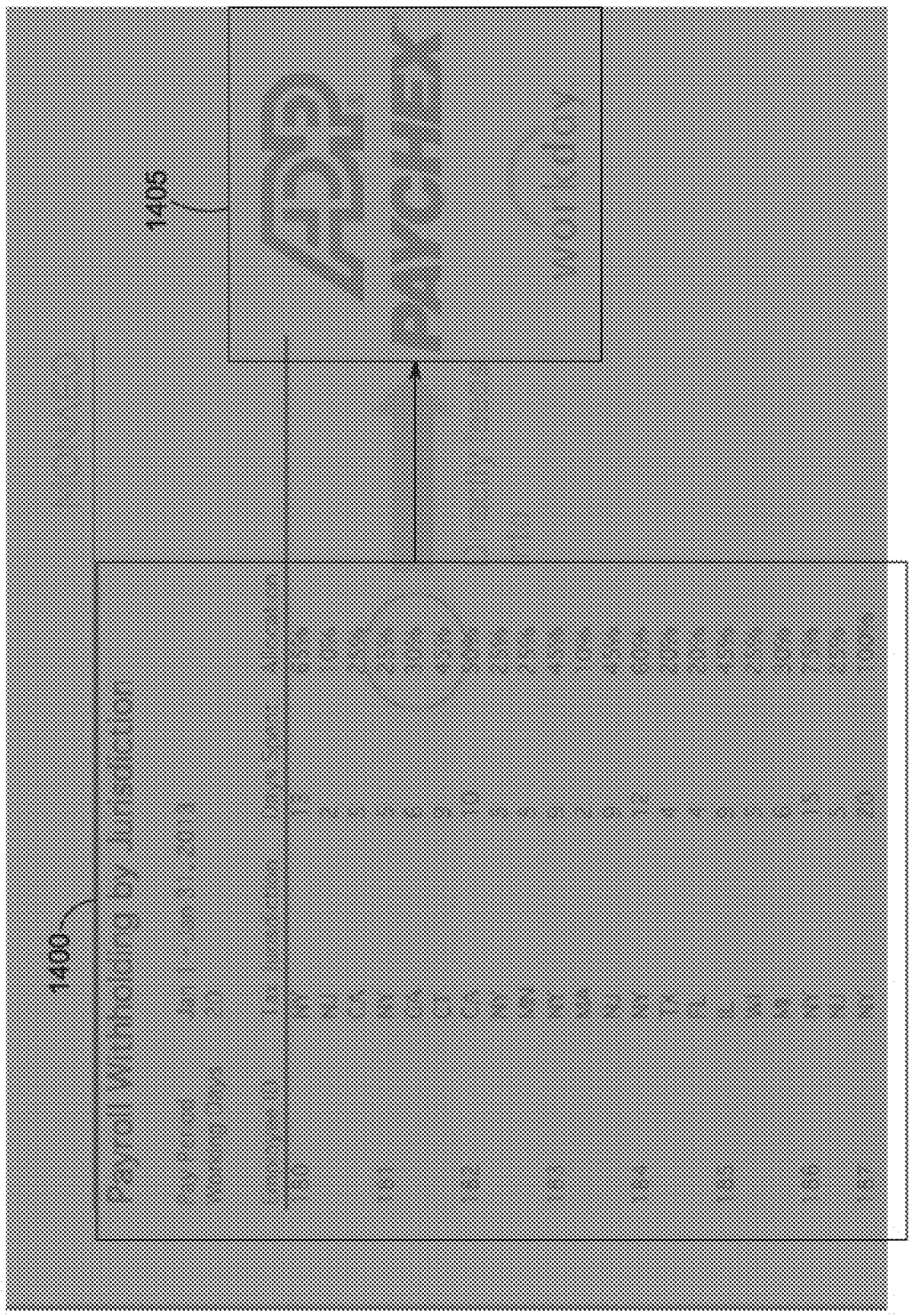
FIG. 14 shows an example of a report generated by an automated regulatory compliance system for payroll withholding, in accordance with an embodiment.
Figure 15:
FIG. 15 shows an example of a Nexus report generated by an automated regulatory compliance system based on an employee footprint, in accordance with an embodiment.
Figure 16:
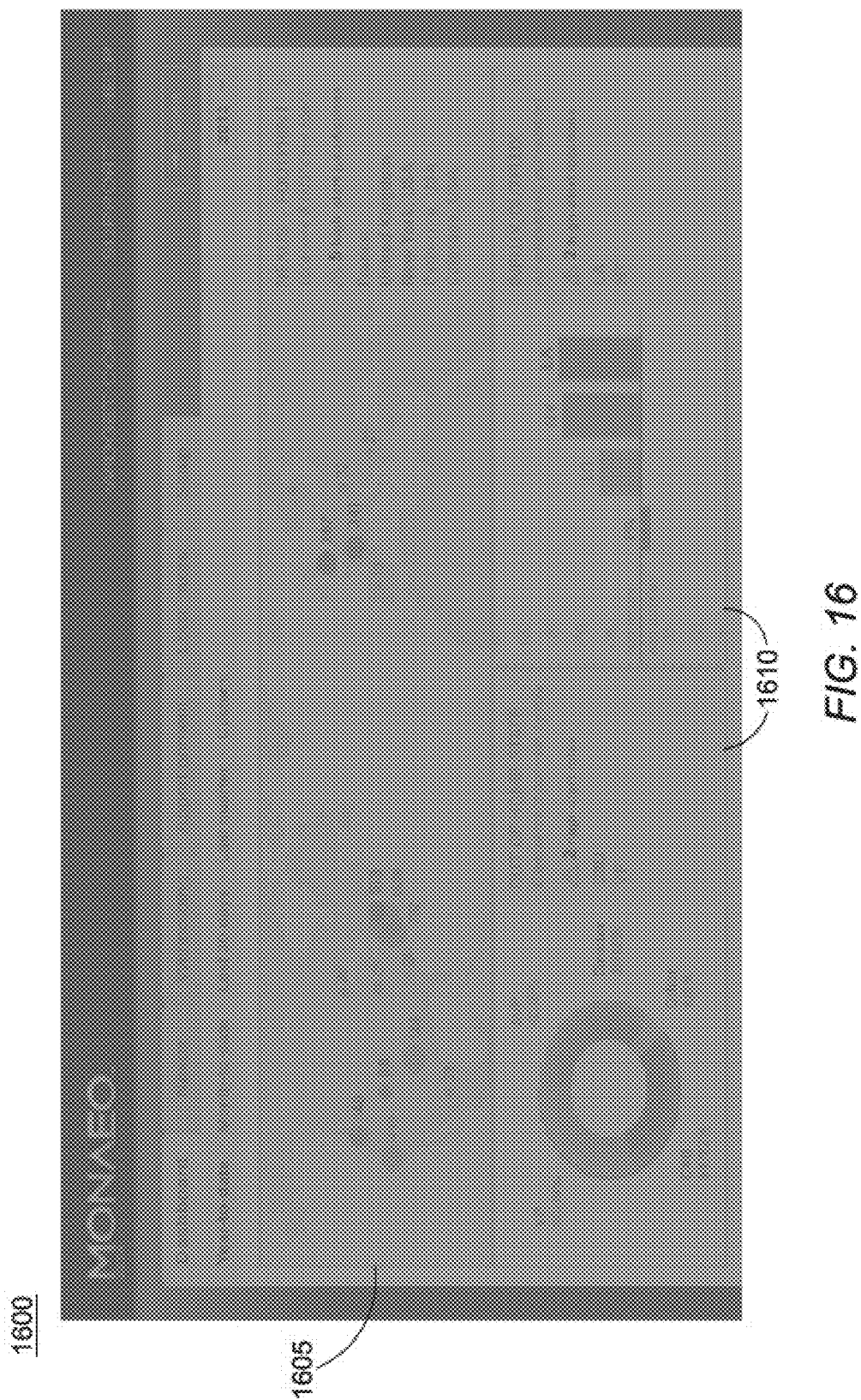
FIG. 16 shows an example of a dashboard displayed on a user interface that shows location tracking visualized on a map integrated with Nexus, in accordance with an embodiment.

FIG. 14 shows an example of a report 1400 generated by an automated tax compliance system for payroll withholding, in accordance with an embodiment. The report may include, for example, an employee identification number rather than an employee name (to preserve privacy), and information regarding days and percentage of time spent in a jurisdiction. The report 1400 may be provided to a payroll withholding system such as, for example, ADP®, PAYCHEX®, and Workday®. FIG. 15 shows an example of a Nexus report 1500 generated by an automated tax compliance system based on an employee footprint 1505, in accordance with an embodiment. According to the example Nexus report 1500, the employee identification, the role of the employee, and a duration of time (in days) in a specific tax jurisdiction may be given. FIG. 16 shows an example of a dashboard 1600 displayed on a user interface that shows location tracking visualized on a map 1605 integrated with Nexus, in accordance with an embodiment. Other statistics and data may be provided regarding location tracking and compliance information, for example using charts 1610 as shown.

In another example, a reliable and highly secure mobile software-as-a-service application may collect passive data and convert it into active value/benefit for its users. In another example, an application may automatically and continuously track users' physical presence (geo-location) in, and movements across various tax jurisdictions, both in the US and internationally. This tracking data may be private to subscribers and, together with the application's various features, may be used in tax planning, optimization and preparation process. The tracking may provide users with detailed and accurate location data which they may be able to use, for example, to prove how many days they spent in a particular tax jurisdiction in case of a tax audit.

In another example, a website may have the majority of the functionality for the automated compliance system, while a mobile client may be light and serve mainly to report data. The website may provide a platform for users to conveniently access, edit and annotate data, print reports, and change settings. The website may also serve as a platform for administrators, employers or third parties including tax, wealth and legal advisors, HR managers, payroll managers, CFOs, or tax managers to manage accounts for their customers, clients or employees, such that a user may grant such access. Such a system may serve to save taxes and increase tax compliance for an individual, company or enterprise.

In another example, location data may be tracked by an application running on a user's mobile device. Alerts may be provided that tell users or administrators when they are getting close to pre-defined number of days in a particular location so that they may keep track and actively manage within the compliance rules. The preferences or settings relating to alerts and notifications management may be configurable by the administrator or user. Moreover, the automated compliance system may allow for account or subscription management. For example, account access may be given to an advisor, assistant or administrator on behalf of a user, client or enterprise to manage the account and track movement for compliance purposes. Such movement tracking may be done anonymously or privately. For example, location tracking information may be provided such that user-specific information (e.g. the user's exact location), may be kept private and not reported. For example, the user's state or city may be reported, but the specific coordinates may be kept private. The system may be "double-blind", where the system does not know the identity of the user but knows details of the user's location whereas the administrators, advisors, companies etc. may know the user identity but not his/her location details.

In another example, biometrics may be used to establish that a user's mobile device indeed represents the location of the user. Examples of techniques for verification of a user's location include, but are not limited to: fingerprints (using, for example, fingerprint verification hardware and/or software externally attached or built into a device); voice recognition; pupil matching, triangulation of data from other sources to corroborate location (for example, a reliability score may be assigned based on the source and match of information); and any other biometric technique.

In another example, the user may define the current tax year for different countries (for example, January to December, or April to March). In another example, regardless of how many data points are gathered by a compliance tracking system for a single visit to a jurisdiction in a day, the data points may be consolidated into a single point, which may be visualized, for example, in a list or map view. In this example, the visualization for a one-hour visit versus a ten-hour visit to the same jurisdiction would be the same. If the visit spans to a subsequent day (for example, after 12 am), it may be logged as an additional visit.

A visit may be defined as being in a single state on a single day (day being defined as 00:00-23:59:59 local time), regardless of the number of "entries" for that state. Leaving a state and returning to it in the same day may count as only a single visit. Multiple geo-data points collected for a single state may count as part of the same visit. A visit to a single state interrupted by a visit to another state (all within the same day) may count as one visit for the purposes of counting days spent in a location but may be displayed as two separate visits in the individual day view.

If there is no location capture for a certain period of time (e.g., six hours), then the time till the next location update may be logged as a missed location. If there is no location update for such a period of time, there may be a system alert for a team to assess if there is a problem with the service/ application, for example, if the system has crashed.

Below is an example algorithm of tracking presence in jurisdiction, in accordance with an embodiment:
Optimizing battery life;
setting a distance x=O (or minimum value acceptable) by default at t=O;
IF the location engine captures more than [15] coordinates in the previous [1] minute interval AND the accuracy≤[50 meters], THEN
    for t between 0 and [30] minutes, set $x=10^{10}$ (or a very high value),
ELSE
    x=0 (or minimum value acceptable)
Definition: NY state and NY city-NYC includes all the 5 boroughs of New York-Manhattan, Bronx, Brooklyn, Queens and Staten Island.
IF (DaySpent=NYC, #Days_NYC+=1 AND #Days_NYState+=1).
    IF (DaySpent=NY outside NYC, THEN Days_NYState+=1).

According to another example, any weekday may be a work day and any weekend may be a personal day. The user or administrator may be able to toggle between work, personal and transit in the system settings. This may address the splitting of the same location into more that one of personal/work/travel on the same day. A default setting may be made where all days in the domicile state/country may be personal days both on weekends and weekdays, for example.

According to another example, a moving window algorithm may be used to filter out location data that is not needed or redundant to make the data set more manageable. Locations that are not needed may be deleted or may be saved in a separate table or may be flagged differently (for example using a I/O bit). In an example, the moving window [j] may have a base Base[j] and a top Top[j]. The base of window w[j+1] may be the top of the previous window [j]. For a window w[j], all locations from time t till t+X minutes including the locations at t+X minutes may fall into window w[j]. Time t may ignore the seconds and only considers hours and minutes. For example, assuming X=30 minutes, if the base of the window is 00:10:32 and there are locations at 00:40:16, 00:40:45, 00:40:59, 00:41:05, then all locations at 00:40:16 and 00:40:59 may be part of the window. The base and top of the window may not have to correspond with actual location time stamps. For example, 00:10 may be the base of a window even if there is no location at 00:10. If there is no location in the next X minutes, then t(Top[j+1])=t(Top[j])+X; in other words, the next window start point may be the last window top+X minutes. The windows may be adjacent but not overlapping such that no location in w[j] may be a part of w[j+1]. Constants or configurable values may be defined in the automated compliance system. For example: DesiredAccuracy=350 meters, Window=30 minutes, MaxGap=4 hours, CutOffAccuracy=750 meters, DiscardAccuracy=1500 meters.

Below is an example of a filtering algorithm, in accordance with an embodiment:

```
For each window w[j]
{Accuracy(Loc[k....1] ) >= DiscardAccuracy -->flag = 0
    If (t(Base[j] - t(last flag))< MaxGap
    {
        A. Latest(Accuracy(Loc[latest time] ) <= DesiredAccuracy) -->
        flag =1
        //in every window, the latest time location which has accuracy less
        than 350m
        B. Latest(Min(Loc[k....1] )) -->flag= 1
        //in every window, the location that has the minimum accuracy in
        the window
        If A. and B. above is same single location entry, then keep only one
        If NYC/state/country[A] = NYC/state/country[B], then flag[A] = 1
        and flag[B] = 0
        NYC/state/country[A] NOT= NYC/state/country[B], then flag[B] = 1
        and Loc[A] = MARK FOR REVIEW
    }
    If (t(Base[j] - t(last flag))> MaxGap
    //this is to avoid creating Missed Locations
    {
        Latest(Min(Loc[k....1] )) -->flag= 1
        //if there has been no location
        flagged= 1 for the last 4 hours (definition of missed location) then
        we flag= 1 the last highest accuracy location in that 4 hour period
        If the location above has accuracy > DesiredAccuracy
        {
            If a location has been captured in city/state/country during the
            local time full day with accuracy < DesiredAccuracy, then
            flag = 1;
            Else we MARK FOR REVIEW by users to decide whether it
            gives the right location or not
        }
    }
}
```

According to an example, a battery drain value may be defined as a percentage of battery drain per hour=(Change in battery life)/(Change in time interval over which the battery life declined). When the beginning battery is 100%, the time corresponding to last of these values may be recorded as the automated compliance system may assume that is when people unplug the phone from the charger. In cases where battery life is going up, those data point may be ignored as the battery is charging. The intervals where the battery has gone down by at least 50% (or some other percentage) may be used. For example, if the battery drain per hour is being calculated and starts at 90%, then if the user plugs the phone again to charge the battery again before it hits 40%, those values may be ignored. The automated compliance system may perform calculations for the last time entry corresponding to 0% (e.g. if there are many 0%).

In another example, when a user is editing or deleting location data, the record may be noted by suitably marking that data somehow to reflect it as user data versus machine generated data. Missed locations which have been entered by the user may be marked as missed data, for example.

In another example, employers, assistants or administrators or other parties may be invited by a user to sign up for an account. Assistants may receive a secure and/or unique hyperlink, which when clicked may take them to a sign-up page. The receiving party may need to enter their details and then submit. Once sign-up has finished, the receiving party may be directly taken to an access page, which may be an advisor-client summary page, for example. In another example, if a user invites an advisor who does not have an account already, the advisor may receive an email with a secure and/or unique hyperlink on the email address provided by the user, which takes the advisor to the sign-up page. Once sign-up complete, the advisor may have the user as one of his clients or customers or employees on his dashboard. An email may be sent to the user letting him know that the advisor obtained access to his account. If the advisor doesn't finish the sign-up process through the unique link provided, then the advisor may have to send an invitation to the client to add the user just like he would for adding other clients or customers or employees.

In the following, examples are given of what an advisor, employer, administrator or other third party (generally referred to as "advisor") may do with access to the automated compliance system. The advisor may be able to view or modify in accordance with the permissions that the user has given. An example of permissions is shown as permission module 211 in FIG. 2. If the user has not given permission, then the link on the page may become disabled. For example, if the user has not checked the box for settings when setting permissions for the advisor, the full settings section may disabled and not accessible to the user. Examples of permissions may include, but are not limited to: view summary log; view detailed log; edit and delete locations; view and edit notes; view alerts; view and edit settings. Not all permissions may be set for a given advisor. The advisor may or may not have access to the user's profile, domicile information, thresholds, alerts, missed days, and/or billing, among other things. An advisor may email, download and print from information from the system, and may or may not have the ability to invite users, for example. An advisor may obtain access to the system via email with a link to signup and a referral code. When the user enters the referral code, the advisor information may be automatically populated. The user may need to validate whether that is the correct information of the advisor.

In other examples, if a location is deleted or edited from the monthly view, then all the corresponding time periods associated with that location in the database, and later in the detailed view, may be modified. Data may change from machine data to user date in the database. In case of a deletion, the location row may be removed. Whenever a user or administrator is trying to edit and/or delete a location, the user may be asked to enter a password and confirm with a warning sign. The user may add notes or toggle between personal, work and transit designations without changing the machine data to user data. For missed days, a separate flag may show that user has inputted this information to differentiate it from data that is edited by the user. This may be true both for data captured in the backend as well as its representation on a user interface or display.

In other examples, an automated compliance application may run continuously or intermittently in the background of a mobile device and may wake up when re-booting the mobile device it is running on to reliably and accurately collect location data. The application may accurately handle important borders in close proximity (for example, the District of Columbia area; the short distance between the west side of Manhattan and the eastern edge of New Jersey; New York city versus Long Island). The application may detect and diagnose data collection related problems, for example, if the application has crashed, location services have become unavailable, or if the phone has been turned off. The application may define a reasonable frequency for checking location coordinates, for example, every X minutes or Y feet or meters. The application may auto-start/launch upon device power-on. The application may protect the location data captured by the application. The application may use a reverse geo-coding service (for example, Google®) to convert the latitude and longitude information into State, city or country. Data may be associated with a user either using an email/username or IMEI/UDID/other primary key. In other examples, the user may input his/her state and country of domicile, or the primary place of resident. A user may select a jurisdiction and set a threshold.

In other examples concerning privacy of user information, users may be able to disable the any aspect of the automated compliance system or method at any time and for any duration of time. For example, when the service is disabled, no location information may be stored. A user or administrator may not be able to retrieve location data for the period the service was disabled. The automated compliance system or method may be configured to reactivate after a certain period of time, which may or may not be determined by the user or administrator. The user may send a copy of the locations captured to an email address of his choice. If the user logs in from a different phone with the same account, the account may be logged out on the earlier phone and location from the new device may be captured. If the automated compliance system is not used for a window of time (for example, 5 minutes), the system may lock and may not be accessed again without entering a password. The system may auto-lock after a period of inactivity or if the user switches out of the application.

In other examples, a status bar for the residency locations may provide an alert (e.g. turn red) when the number of days left in a jurisdiction is less than the number of days when the user has chosen to get alerts AND less than the number of days left till the end of the year. If the phone is off or out of coverage area, then the location may be captured as a missed location in the log. The user may be able to change a missed location to the known location. The user may have the ability to allocate multiple missed locations with the same location. The user may pick whether the missed location was for personal, transit or work purposes. The user may add one or more locations for the missed locations. Changing a record may require the user to type in his password. The record after being edited may be noted as user data or machine data. All of the above examples may be performed by a user or an administrator, advisor, employer or other party with access to the system.

The invention is not to be limited to the specific embodiments disclosed, and modifications and other embodiments are intended to be included within the scope of the invention.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, terminal, base station, RNC, or any host computer.

What is claimed is:

1. A system for tracking movements of a user that increases processing efficiency of a computer database, the system comprising:
   at least one network interface configured to be communicatively coupled to each device from a plurality of devices and including a location sensor;
   a memory, including the computer database; and
   a processor communicatively coupled to the network interface and the memory;
   the processor being configured to:
      receive, using the at least one network interface, tracking information from the location sensor of a first device from the plurality of devices, the tracking information identifying a location of a user at a particular time;

retrieve, from the memory an indicator of a window size, a maximum gap size, and a discard threshold;

applying a moving filter having the window size to form a reduced record set, the moving filter:

deleting records where the tracking information stored in a record indicates that the user has moved less than the discard threshold, and preserving at least one record when the tracking information of the maximum gap size is not exceeded, retrieve, from the memory, a plurality of compliance rules;

apply the plurality of compliance rules to the reduced record set to form user tracking data; and store the user tracking data in the computer database.

2. The system of claim 1, wherein the first device is a mobile device, a personal computer, a tablet computer, or a wearable computer.

3. The system of claim 1, wherein the processor is configured to retrieve the tracking information from the location sensor based on event triggers.

4. The system of claim 1, wherein the tracking information further includes a device identifier associated with the first device.

5. The system of claim 1, wherein the user tracking data is retrievable via a website.

6. The system of claim 1, wherein the processor is further configured to:

send, using the at least one network interface, an alert to the user when the user tracking data indicates a violation of a compliance rule from the plurality of compliance rules.

7. The system of claim 1, wherein the location sensor determines the location tracking information based on at least one of the following: global positioning system (GPS) information, Wi-Fi data, cell tower triangulation, wireless network data, user generated location information, compass data, orientation data, gyroscope data, and accelerometer data.

8. The system of claim 1, wherein the tracking information further includes an indication of accuracy of the location sensor.

9. The system of claim 8, wherein the processor further: deletes records from the database based on the indication of accuracy.

10. A method for tracking movements of a user that increases processing efficiency of a computer database, the method comprising:

receiving, by a processor, first location tracking information from a location sensor of a device, the tracking information identifying a location of a user associated with the device at a particular time;

storing, by the processor, the tracking information for the user in the computer database;

retrieving, by the processor, a window size, a maximum gap size and a discard threshold from a memory;

deleting, by the processor, records in the computer database for the user by applying a moving filter having the window size to form a reduced record set, the moving filter:

deleting records where the tracking information stored in a record indicates that the user has moved less than the discard threshold, and preserving at least one record when the tracking information of the maximum gap size is not exceeded, retrieving, by the processor, a plurality of compliance rules from the memory;

applying, by the processor, the plurality of compliance rules to the reduced record set to form user tracking data; and storing, by the processor, the user tracking data in the computer database.

11. The method of claim 10, wherein the device is a mobile device, a personal computer, a tablet computer, or a wearable computer.

12. The method of claim 11, wherein the location sensor determines the location tracking information based on at least one of the following: global positioning system (GPS) information, Wi-Fi data, cell tower triangulation, wireless network data, user generated location information, compass data, orientation data, gyroscope data, and accelerometer data.

13. The method of claim 10, wherein the processor is configured to retrieve the tracking information from the location sensor based on event triggers.

14. The method of claim 10, wherein the tracking information further includes an indication of accuracy of the location sensor.

15. The method of claim 14, wherein the method further comprises:

deleting, by the processor, records from the database based on the indication of accuracy.

* * * * *